United States Patent Office 3,542,777
Patented Nov. 24, 1970

3,542,777
DERIVATIVES OF 9-PYRIDYLALKYL-
1,2,8,9-TETRAAZAPHENALENES
John E. Francis, Pleasantville, N.Y., assignor to Geigy
Chemical Corporation, Ardsley, N.Y., a corporation of
New York
No Drawing. Filed Aug. 12, 1968, Ser. No. 751,734
Int. Cl. C07d 57/02
U.S. Cl. 260—250          13 Claims

ABSTRACT OF THE DISCLOSURE 9-pyridylalkyl - 1,2,8,9 - tetraazaphenalenes, optionally substituted in the 3-position by hydroxy or mercapto and in the 7-position by phenyl, are hypotensive agents.

---

The present invention pertains to a class of 1,2,8,9-tetraazaphenalenes which is graphically depicted by the following structural formula:

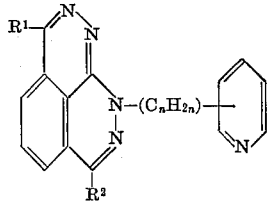

wherein $n$ has a value of from 1 to 4;
$R^1$ is hydrogen, hydroxy or mercapto; and
$R^2$ is hydrogen or phenyl.

Also included within the scope of the present invention are the acid addition salts of these 9-pyridylaklyl-1,2,8,9-tetraazaphenalene derivatives, obtained via the conventional methods. Typical salts thus include those derived from hydrochloric, hydrobromic, sulfuric, phosphoric, methanesulfonic, acetic, lactic, succinic, embonic, malic, maleic, aconitic, phthalic, tartaric and the like acids. Quaternary salts derived from alkyl halides are also within the scope of this invention.

The term "(lower)alkyl" denotes a branched or straight hydrocarbon chain containing up to and including 6 carbon atoms. Illustrative of such groups are methyl, ethyl, propyl, isopropyl, n-butyl, sec-butyl, t-butyl, pentyl, hexyl and the like.

The pyridyl group on the alkylene bridge can be joined through its 2-, 3- or 4-position. The alkylene bridge can be branched or straight chained and have from 1 to 4 carbon atoms, preferably 1 or 2.

The compounds of the present invention have demonstrated the property of lowering blood pressure in warm blooded animals when administered orally or parenterally and are thus useful as hypotensive agents. The hypotensive properties of this class of compounds can be conveniently observed in the laboratory model in such recognized tests as the angiotensin-induced hypertensive dog, the renal hypertensive (Goldblatt) dog or the intact anaesthetized cat.

The following description of using and making the invention represents the best modes presently contemplated for carrying out the invention. For use as hypotensive agents, the compounds of the present invention are incorporated in compositions suitable for oral administration to animals in solid and liquid unit dosage forms, such as tablets, capsules, powders, granules, syrups, elixirs, and the like. The term unit dosage form as used in this specification and claims refers to physically discrete units suitable as unitary dosages for animals, each unit containing a predetermined quantity of active material calculated to produce the desired therapeutic effect in association with the required pharmaceutical diluent, carrier or vehicle.

Powders are prepared by comminuting a compound of this invention to a suitably fine size and mixing with a similarly comminuted diluent. The diluent can be an edible carbohydrate material such as starch. A sweetening agent or sugar may also be present as well as flavoring oil.

Granules for reconstitution into a liquid oral preparation are prepared utilizing water-soluble diluents. A powder mixture of the finely divided compound and a water-soluble diluent such as sucrose, glucose, and the like, is wetted with a binder such as acacia mucilage, gelatin solution, methyl-cellulose solution and forced through a screen to form granules which are allowed to dry. A suspending agent such as tragacanth may be included in the composition.

Capsules are made by preparing a powder mixture as described above and filling formed gelatin sheaths. As an adjuvant to the filling operation, a lubricant such as talc, magnesium stearate and calcium stearate may be added to the powder mixture before the filling operation.

Tablets are made by preparing a powder mixture, granulating or slugging, adding a lubricant and pressing into tablets. The powder mixture is prepared by mixing the compound, suitably comminuted, with a diluent or base such as starch, sucrose, kaolin, dicalcium phosphate and the like. The powder mixture can be granulated by wetting with a binder such as syrup, starch paste or acacia mucilage and forcing through a screen. As an alternative to granulating, the powder mixture can be slugged, i.e., run through the tablet machine and the resulting imperfectly formed tablets broken into pieces (slugs). The slugs can be lubricated to prevent sticking to the tablet forming dies by means of the addition of stearic acid, a stearate salt, talc or mineral oil. The lubricating mixture is then compressed into tablets. A protective coating consisting of a sealing coat of shellac, a coating of sugar and methylcellulose, and a polish coating or carbauba wax may be provided.

Oral fluids are prepared in unit dosage forms such as syrups and elixirs wherein each teaspoonful of composition contains a predetermined amount of the compound for administration.

A syrup is prepared by suspending the compound in a suitably flavored aqueous sucrose solution. Similarly, an elixir is prepared utilizing a nontoxic alcohol vehicle.

For parenteral administration, aqueous and oleaginous fluid unit dosage forms can be prepared. In preparing the parenteral form, a measured amount of the compound is placed in a vial, the vial and its contents sterilized and sealed. An accompanying vial of sterile water may be provided as a vehicle to form a suspension prior to administration.

The amount of these compounds which is administered in use to effect a hypotensive response must in all cases be adjusted to the animal being treated, its age, weight, and condition as well as the degree of response required. Thus while a hypotensive response is observed for these compounds in the range of about .03 mg./kg. to about 30 mg./kg., the actual dose should be carefully titrated to the particular hypertensive subject in accordance with well recognized principles of pharmacology.

The preparation of these compounds can be achieved in a first embodiment by treating a 9-unsubstituted 1,2,8,9-tetraazaphenalene of Formula II with a pyridylalkyl chloride or bromide of Formula III:

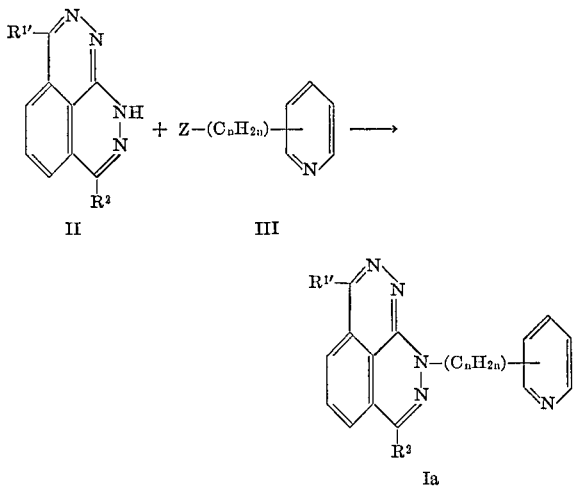

In the above transformation, Z is chloro or bromo, R¹' is hydrogen or hydroxy, and R² is as previously defined. The reaction is executed in the presence of a base such as sodium or potassium hydroxide, sodium methodixe, sodium carbonate or the like, optionally in a suitable organic solvent such as methanol, ethanol, dimethylsulfoxide, dimethylformamide or the like. External heating of up to about 100° C. can be applied. The product is isolated by conventional techniques such as concentration and solvent extraction and is purified through chromatography or recrystallization.

A modification of the foregoing procedure leading to those compounds of Formula I wherein R¹ is hydroxy involves alkylation of a substituted 1(2H)-phthalazinone of Formula IV with pyridylalkyl halide of Formula III above, followed by treatment of the resulting pyridylalkyl-1(2H)-phthalazinone with hydrazine:

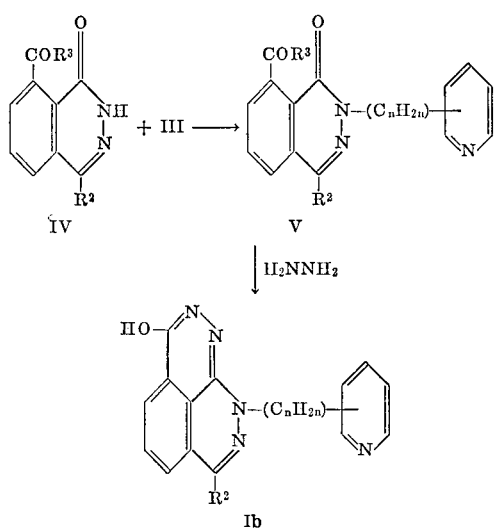

In the above transformation, R³ is hydroxy or alkoxy, and R² and n are as previously defined.

The 2-pyridylalkyl-1(2H)-phthalazinone of Formula V where R³ is hydroxy can be alternatively obtained through treatment of a 3-hydroxy-7-carboxyphthalide with a single mole of a pyridylalkylhydrazine.

In a second embodiment of the present invention, a 1,2,8,9-tetraazaphenalene of Formula VI is treated with a vinylpyridine in glacial acetic acid and a catalytic amount of copper sulfate to yield to compounds of Formula VII.

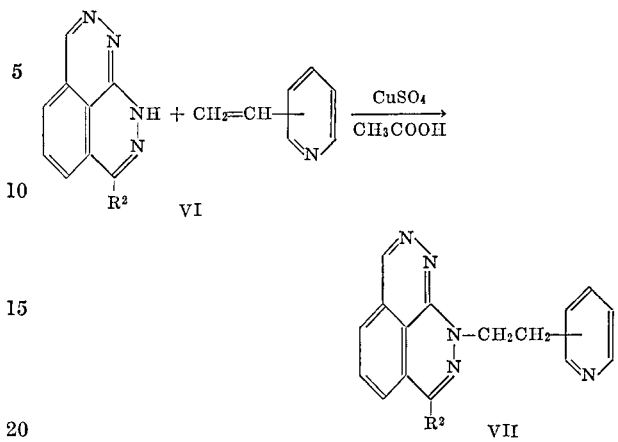

In the above transformation R² is as previously defined.

The compounds of Formula I wherein R¹ is mercapto are readily obtained from the corresponding compounds wherein R¹ is hydroxy through treatment with phosphorus pentasulfide in refluxing pyridine.

The tetraazaphenalene starting materials disclosed herein are the subject of copending applications. Briefly their preparation involves treatment of a compound of the formula:

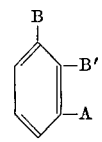

wherein A is an aldehyde or dibromoethyl group when R² is hydrogen or a benzoyl group when R² is phenyl and each of B and B' is a carboxy group or a group the oxidative state of which corresponds to that of a carbonyl group, such as an acid halide, anhydride, ester or lactone, with a single molar equivalent of hydrazine to yield a 1(2H)-phthalazinone of Formula IV wherein R³ is hydroxy. This may be converted to the corresponding acid chloride or acid bromide or, preferably, esterified to yield a compound of Formula IV wherein R³ is alkoxy. This intermediate is then treated with a second molar equivalent of hydrazine to yield the tetraazaphenalene of Formula II wherein R¹' is hydroxy. The corresponding starting material wherein R¹' is hydrogen is obtained through an analogous treatment of a 2-carbonyl-6-aldehydobenzoic acid (which is equivalent to a 3-hydroxy-7-aldehydophthalide) with two moles of hydrazine. Alternatively the compounds of Formula II wherein R¹' is hydrogen, i.e., the compounds of Formula VI, are obtained through a two step process of treatment of the corresponding hydroxy compound with phosphorus pentasulfide in refluxing pyridine to yield the 3 - mercapto - 1,2,8,9 - tetraazaphenalene which is then treated with Raney nickel.

The following examples will serve to further typify the nature of the present invention without being a limitation on the scope thereof.

PREPARATION I 3-hydroxy-7-phenyl-1,2,8,9-tetraazaphenalene (a) 8-carboxy-4-phenyl-1(2H)-phthalazinone.—A mixture of 32.5 g. of 3-benzoylphthalic acid and 85 ml. of hydrazine hydrate in 145 ml. of water is heated at reflux for 18 hours. Upon cooling and acidification with hydrochloric acid, the product forms as a solid. This is collected and recrystallized from glacial acetic acid, M.P. 257–259°.

(b) 8-carbomethoxy - 4 - phenyl - 1(2H) - phthalazinone.—The product of part (a) (19.0 g.), 32 ml. of thionyl chloride and 115 ml. of chlorobenzene are heated at reflux with stirring and exclusion of moisture for 3 hours. The solid obtained upon concentration under reduced pressure is taken up in 300 ml. of methanol and this solution is then heated at reflux for 18 hours. Upon cooling the product, M.P. 198–202°, is collected and can be used directly in the next step.

(c) 3 - hydroxy - 7 - phenyl - 1,2,8,9 - tetraazaphenalene.—A mixture of 18.6 g. of 8-carbomethoxy-4-phenyl-1(2H)-phthalazinone, 400 ml. of hydrazine hydrate and 100 ml. of water is heated at reflux for 20 hours. The solid which forms upon cooling is collected, washed with water and recrystallized from methyl cellosolve, M.P. over 350° C.

PREPARATION II 3-hydroxy-1,2,8,9-tetraazaphenalene (a) 3-dibromomethylphthalic anhydride.—A mixture of 3-methylphthalic anhydride (81 g.), N-bromosuccinimide (182 g.), benzoyl peroxide (40 mg.) and carbon tetrachloride (1500 ml.) is irradiated and heated to reflux by a 100 watt insertion-type ultraviolet lamp under stirring and exclusion of moisture. After the mixture becomes brick red, an additional 40 mg. of benzoyl peroxide is added. Illumination at reflux is carried out during 24 hours. The mixture is cooled and filtered free of succinimide and the filtrate is evaporated in vacuo. The residual yellowish brown solid is dissolved in hot ether, treated with decolorizing charcoal and filtered. Addition of hexane to the filtrate affords the crystalline product, M.P. 90.5–93° C. in 72% yield. Two recrystallizations from ether-hexane yield colorless needles melting at 93–95° C.

Calc. for $C_9H_4Br_2O_3$ (percent): C, 33.78; H, 1.26; Br, 49.92. Found (percent) C, 33.66; H, 1.20; Br, 49.41.

(b) 3-hydroxy-7-carboxyphthalide. — 3-dibromomethylphthalic anhydride (40 g.) is added in small portions to a hot solution of 2N sodium hydroxide (500 ml.) with stirring. After ten minutes, the clear solution is rendered strongly acidic with concentrated hydrochloric acid and heated for one-half hour at 80°. The solution is evaporated to dryness in vacuo and the residue is dissolved in hot water (600 ml.), treated with decolorizing charcoal and filtered. After three days at 5° C., the colorless filtrate yields 21.3 g. (88%) of colorless blocks, M.P. 163.5–166° C.

(c) 8-carboxy-1(2H)-phthalazinone.—A mixture of 30.2 g. of 3-hydroxy-7-carboxyphthalide, 50 ml. of 100% hydrazine hydrate and 100 ml. of water is heated at reflux for 16 hours. The mixture is rendered acidic with dilute hydrochloric acid and the solid which forms is collected by filtration, washed with water, dried and recrystallized from glacial acetic acid to yield the intermediate product, M.P. 303.5–306° C.

(d) 3-hydroxy-1,2,8,9-tetraazaphenalene. — Treatment of the product of part (c) with hydrazine according to the procedure of part (c) of Preparation I yields 3-hydroxy-1,2,8,9-tetraazaphenalene, M.P. above 350° C.

PREPARATION III 1,2,8,9-tetraazaphenalene

Upon refluxing a mixture of 44.14 g. of 3-hydroxy-1,2,8,9-tetraazaphenalene, 58.2 g. of phosphorus pentasulfide and 356 ml. of pyridine for 2.5 hours, there is formed 3-mercapto-1,2,8,9-tetraazaphenalene which is isolated by collecting the solid which forms upon quenching the reaction mixture in ice-water, drying the same in vacuo at 100° C. and recrystallizing it from dimethylformamide-water.

This product is dissolved in methyl Cellosolve and ethanol and reduced with Raney nickel to yield 1,2,8,9-tetraazaphenalene, M.P. 294–298° C.

7-phenyl-1,2,8,9-tetraazaphenalene, M.P. 292–293° C. is obtained in an analogous fashion.

Alternatively 3-hydroxy-7-aldehydophthalide and 3-hydroxy-7-benzoylphthalide can be treated with hydrazine to respectively yield 1,2,8,9-tetraazaphenalene and 7-phenyl-1,2,8,9-tetraazaphenalene.

EXAMPLE 1

3-hydroxy-9-(2-pyridylmethyl)-1,2,8,9-tetraazaphenalene

A solution of 16.4 g. of 2-pyridylmethyl chloride hydrochloride in 100 ml. of dry methanol is neutralized under cooling with 100 ml. of 1 N sodium hydroxide and promptly added to a solution of 20.4 ml. of 8-carbomethoxy-1(2H)-phthalazinone in 250 ml. of methanol. This mixture is treated with 1 N sodium hydroxide and heated at reflux for 60 minutes. The solution is evaporated at reduced pressure to a semi-solid mass, dissolved in 1 N hydrochloric acid and extracted with chloroform. The acidic layer is cooled and filtered and the filtrate rendered basic with 20% aqueous sodium carbonate and extracted with chloroform. The chloroform extracts are dried over anhydrous sodium sulfate and concentrated at reduced pressure. The residual ester, 2-(2-pyridylmethyl)-8-carbomethoxy-1(2H)phthalazinone, is heated at reflux for 40 hours with a mixture of 420 ml. of 100% hydrazine hydrate and 140 ml. of water with stirring. The mixture is cooled and the yellow solid collected, washed with water and air dried. The crude material is recrystallized twice from ethanol to afford the pure product, M.P. 275.5–276.5° C.

Calc. for $C_{15}H_{11}N_5O$ (percent): C, 64.97; H, 4.00; N, 25.26. Found (percent): C, 64.72; H, 4.00; N, 25.55.

In a similar fashion the hydrochloride salts of 3-pyridylmethyl chloride and 4-pyridylmethyl chloride are substituted for 2-pyridylmethyl chloride hydrochloride and there are thus respectively obtained 3-hydroxy-9-(3-pyridylmethyl) - 1,2,8,9 - tetraazaphenalene, M.P. 236–238.5° C. and 3-hydroxy - 9 - (4-pyridylmethyl)-1,2,8,9-tetraazaphenalene, M.P. 253–255° C.

EXAMPLE 2

3-hydroxy-9-[2-(2-pyridyl)ethyl]-1,2,8,9-tetraazaphenalene (a) 2-[2-(2-pyridyl)ethyl]-8-carboxy - 1(2H) - phthalazinone.—Thirty-nine grams of 2-(2-pyridyl)ethyl hydrazine are added to a stirring suspension of 48.5 g. of 3-hydroxy-7-carboxyphthalide in 500 ml. of water and this mixture is heated at reflux for 18 hours, cooled and filtered. The solid is washed with water, dried and recrystallized from water to afford the intermediate product, M.P. 205–207° C.

(b) 3-hydroxy - 9 - [2-(2-pyridyl)ethyl] - 1,2,8,9-tetraazaphenalene.—A mixture of 8 ml. of thionyl chloride, 60 ml. of chlorobenzene and 5.9 g. of 2-[2-(2-pyridyl)ethyl]-8-carboxy-1-(2H)-phthalazinone is heated at reflux under moisture exclusion for three hours. The solution is then concentrated to dryness at reduced pressure and the residue treated with 200 ml. of methanol and heated at reflux for 18 hours. The reaction mixture is next concentrated to dryness at reduced pressure and the residual oily ester treated at reflux with 80 ml. of hydrazine hydrate and 20 ml. of water for 24 hours. This mixture is then cooled and the solid which forms is collected, washed with water and dried to yield the product, M.P. 234–237° C.

In a similar fashion from 2-(4-pyridyl)ethyl hydrazine there is obtained 3-hydroxy - 9 - [2-(4-pyridyl)ethyl]-1,2,8,9-tetraazaphenalene, M.P. 200.5–203° C.

EXAMPLE 3

3-hydroxy-7-phenyl-9[2-(2-pyridyl)ethyl]-1,2,8,9-tetraazaphenalene

A mixture of 15.9 g. of 3-hydroxy-7-phenyl-1,2,8,9-tetraazaphenalene, 100 ml. of dimethylsulfoxide, 3.6 g. of sodium methodixe and 8.5 g. of 2-(2-pyridyl)ethyl chloride is stirred under moisture exclusion at 80° C. for four hours. The mixture is poured into ice-water and the precipitate collected, dried and suspended in chloroform. The chloroform solution is concentrated to dryness and the solid recrystallized from ethanol to yield the product, M.P. 247–251° C.

Calc. for $C_{22}H_{17}N_5O$ (percent): C, 71.91; H, 4.67; N, 19.06. Found (percent): C, 71.74; H, 4.68; N, 18.92.

By utilizing 3-hydroxy-1,2,8,9-tetraazaphenalene in this procedure, there is obtained 3-hydroxy-9-[2-(2-pyridyl)ethyl]-1,2,8,9-tetraazaphenalene, M.P. 234–238° and identical in infrared spectra to the product obtained via the procedure of Example 2.

Similarly through utilization of 1,2,8,9-tetraazaphenalene, there is obtained 9 - [2-(2-pyridyl)ethyl]-1,2,8,9-tetraazaphenalene, M.P. 160–162° C.

EXAMPLE 4

9-[2-(2-pyridyl)ethyl]-1,2,8,9-tetraazaphenalene

A mixture of 1.7 g. of 1,2,8,9-tetraazaphenalene, 4 ml. of 2-vinylpyridine, 25 ml. of glacial acetic acid and a few crystals of anhydrous copper sulfate is heated at 135 to 140° C. for four hours. Evaporation of the mixture yields a solid which is allowed to stand in a few ml. of methanol at −20° for 18 hours. The solid which precipitates is collected, washed with methanol and dried to yield the product, M.P. 160–162° C.

EXAMPLE 5

3-hydroxy-9-[2-(2-pyridyl)ethyl]-1,2,8,9-tetraazaphenalene hydrochloride

Eleven grams of the product of Example 2 are dissolved in 450 ml. of 1 N hydrochloric acid and the solution is then concentrated to dryness at reduced pressure. The solid is recrystallized from methanol to yield 3-hydroxy - 9 - [2-(2-pyridyl)ethyl)] - 1,2,8,9-tetraazaphenalene hydrochloride, M.P. 280° C. (dec.).

EXAMPLE 6

3-hydroxy-9-(3-pyridylmethyl)-1,2,8,9-tetraazaphenalene methanesulfonate

To a suspension of 6.1 g. of 3-hydroxy-9-(3-pyridylmethyl)-1,2,8,9-tetraazaphenalene in 100 ml. of warm methanol are added 2.5 g. of methanesulfonic acid in 10 ml. of methanol. The solid which forms is collected by filtration, air dried and recrystallized twice from methanol to yield the product, M.P. 261–263° C.

EXAMPLE 7

3-mercapto-9-(2-pyridylethyl)-1,2,8,9-tetraazaphenalene

A mixture of 15 g. of 3-hydroxy-9-(2-pyridylethyl)-1,2,8,9-tetraazaphenalene, 13 g. of phosphorus pentasulfide and 130 ml. of pyridine is stirred at reflux for three hours and then poured into ice-water. The solid is collected, washed with water, dried and recrystallized from methyl cellosolve to yield the product, M.P. 310° C. (dec.).

EXAMPLE 8

Ingredient: Quantity/capsule, mg.
3-hydroxy-9-(2-pyridylmethyl) - 1,2,8,9 - tetraazaphenalene _____ 10
Corn, starch, U.S.P. _____ 200

The foregoing ingredients are mixed and introduced into a two-piece No. 1 hard gelatin capsule.

EXAMPLE 9

Ingredient: Quantity/tablet, mg.
3-hydroxy-7-phenyl-9-[2-(2 - pyridyl)ethyl]1,2,8,9-tetraazaphenaline _____ 50
Corn starch U.S.P. _____ 130
Lactose _____ 160
Cab-O-sil M–5 _____ 4
Gelatin U.S.P. _____ 5
Magnesium stearate U.S.P. _____ 1

The foregoing ingredients are thoroughly mixed and pressed into tablets suitable for oral administration of 50 g. of active ingredient. The tablets may be scored to permit administration of fractional doses.

EXAMPLE 10

Ingredient: Quantity/tablet, mg.
9-[2-(2 - pyridyl)ethyl] - 1,2,8,9-tetraazaphenalene _____ 250
Lactose _____ 80
Corn starch _____ 70
Soluble starch _____ 15
Magnesium stearate _____ 5

The first three ingredients are thoroughly mixed and granulated with a solution of the soluble starch. This granulate is dried, mixed with the magnesium stearate and pressed into tablet cores which are coated as with sugar.

What is claimed is:

1. A compound of the formula:

wherein:

$n$ has a value of from 1 to 4;
$R^1$ is hydogen, hydroxy or mercapto; and
$R^2$ is hydrogen or phenyl.

2. The nontoxic pharmaceutically acceptable acid addition salts of a compound according to claim 1.

3. A compound according to claim 1 wherein $R^1$ is hydroxy.

4. A compound according to claim 1 wherein $R^1$ is hydroxy, and $n$ is 1 or 2.

5. A compound according to claim 1 wherein $R^1$ is hydroxy, $R^2$ is hydrogen, and $n$ is 1 or 2.

6. The compound according to claim 1 wherein $R^1$ is hydroxy, $R^2$ is hydrogen, $n$ is 1 and the pyridyl group is bound through the 2-position.

7. The compound according to claim 1 wherein $R^1$ is hydroxy, $R^2$ is hydrogen, $n$ is 1 and the pyridyl group is bound through the 3-position.

8. The compound according to claim 1 wherein $R^1$ is hydroxy, $R^2$ is hydrogen, $n$ is 1 and the pyridyl group is bound through the 4-position.

9. The compound according to claim 1 wherein $R^1$ is hydroxy, $R^2$ is hydrogen, the group —$(C_nH_{2n})$— is ethylene and the pyridyl group is bound through the 2-position.

10. The compound according to clam 1 wherein $R^1$ is hydroxy, $R^2$ is hydrogen, the group —$(C_nH_{2n})$— is ethylene and the pyridyl group is bound through the 4-position.

11. The compound according to claim 1 wherein $R^1$ is hydroxy, $R^2$ is phenyl, the group —$(C_nH_{2n})$— is ethylene and the pyridyl group is bound through the 2-position.

12. The compound according to claim 1 wherein $R^1$ and $R^2$ are hydrogen, the group $-(C_nH_{2n})-$ is ethylene and the pyridyl group is bound through the 2-position.

13. The compound according to claim 1 wherein $R^1$ is mercapto, $R^2$ is hydrogen, the group $-(C_nH_{2n})-$ is ethylene and the pyridyl group is bound through the 2-position.

References Cited

UNITED STATES PATENTS 3,429,882  1/1969  Doebel et al.

NICHOLAS S. RIZZO, Primary Examiner

U.S. Cl. X.R.

424—250